Sept. 24, 1957   W. J. BUEDINGEN   2,807,110
FASTENING DEVICE
Filed April 4, 1955
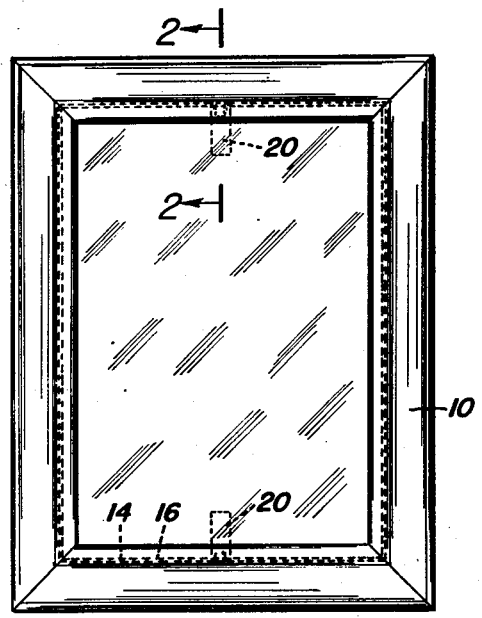
FIG. 1.
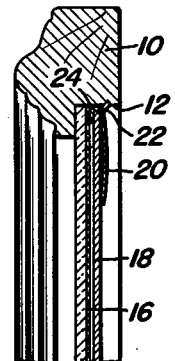
FIG. 2.
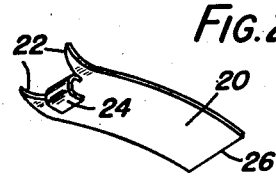
FIG. 3.
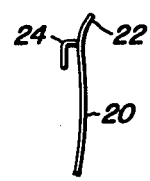
FIG. 4.
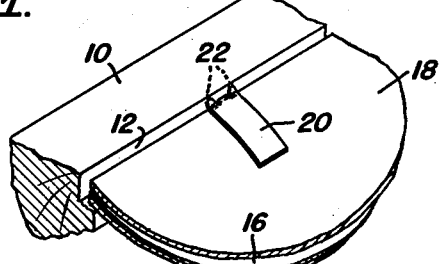
FIG. 6.
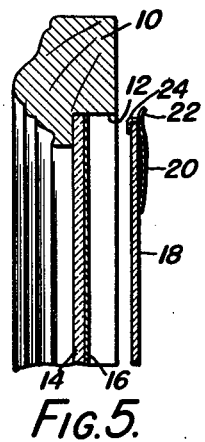
FIG. 5.
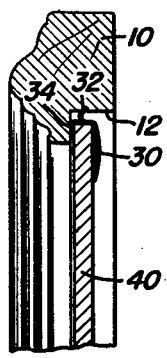
FIG. 9.
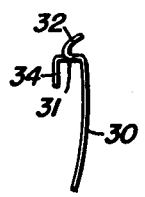
FIG. 8.
FIG. 7.
INVENTOR.
W. J. BUEDINGEN
BY
ATTORNEY

United States Patent Office 2,807,110
Patented Sept. 24, 1957

2,807,110

FASTENING DEVICE

William John Buedingen, Rochester, N. Y.

Application April 4, 1955, Serial No. 498,831

4 Claims. (Cl. 40—156)

The present invention relates to fastening devices and more particularly to devices for fastening photographs and other types of pictures in rabbeted, wooden, picture frames.

Heretofore, brads have been used for holding pictures in frames of this type. The brads have to be driven into the frame with a hammer or other implement. Since the brads abut against the back of the picture, or a backing member therefor, they are difficult and awkward to drive in, and considerable time is required for their insertion. Further, where the picture is protected by glass, there is always danger of breakage of the glass during driving in of the brads. Not infrequently, also, the frame is split or marred. Moreover, when a picture has to be removed from the picture frame it is a difficult job to pull the brads out.

The primary object of this invention is to provide a greatly simplified mode of fastening a picture, such as a photograph, or a painting on hard board, in a rabbeted, wooden, picture frame.

Another object of this invention is to provide fastening means which can readily be engaged with a wooden picture frame without tools, and, which will securely hold a picture in a picture frame.

Another object of this invention is to provide a fastening device for securing a picture in a rabbeted, wooden, picture frame which will enable a picture to be secured in a frame much quicker than heretofore.

Another object of this invention is to provide means for fastening a picture in a wooden picture frame which will eliminate the danger of splitting or materially marring the frame.

Another object of the invention is to provide means for fastening pictures in wooden picture frames which will reduce to a minimum the number of fastening devices required to securely retain a picture in a frame.

A further object of this invention is to provide means for fastening a picture in a picture frame which can readily be removed.

Other objects of the invention will be apparent hereinafter from the specification and from the recital of the appended claims.

In the drawing:

Fig. 1 is a front elevation showing a picture frame having a picture secured therein by fastening devices made according to one embodiment of the present invention, the picture being shown in blank for convenience;

Fig. 2 is an enlarged, fragmentary section taken on the line 2—2 of Fig. 1 looking in the direction of the arrows and showing a picture, such as a photograph, and its protecting glass, secured in place in the frame;

Fig. 3 is a perspective view of a fastening device made according to one embodiment of this invention;

Fig. 4 is a side view of this fastening device;

Fig. 5 is a diagrammatic view illustrating the method of assemblage of the backing member and the fasteners in the frame;

Fig. 6 is a fragmentary perspective view, showing the backing member in place in the picture frame and illustrating the manner in which the fastening device engages the picture frame to hold the assembled parts in place;

Fig. 7 is a perspective view of a fastening device constructed according to another embodiment of this invention;

Fig. 8 is a side view of the fastening device shown in Fig. 7; and

Fig. 9 is an enlarged fragmentary section, similar to Fig. 2, showing the fastening device of Figs. 7 and 8 in use for holding a picture, such as a painting on hard board, in a picture frame.

Referring now to the drawing by numerals of reference, 10 denotes a conventional wooden picture frame having a rabbet or groove 12 at its rear face. 14 denotes a sheet of glass, 16 a photograph or other relatively thin picture, and 18 a conventional backing member, which may be mounted in the frame (Figs. 1, 2, 5 and 6). Member 18 serves to hold the glass and picture in the frame 10; and, it is held itself within the frame by fastening devices 20 constructed according to one embodiment of this invention.

Each fastening device 20 (Figs. 3 and 4) is made from a substantially rectangular, resilient, metal stamping, which is slit, cut and bent at one end to form a pair of sharp, prongs 22 at opposite side edges and an intermediate hook 24. Hook 24 is formed by bending the metal downwardly and then inwardly so that its free end is approximately parallel to the body portion of the fastener. The prongs 22 are bent slightly upwardly with reference to said body portion from their inner to their outer ends; and, as shown in Fig. 4, the body portion itself of the fastener is itself formed with a slight curvature from end to end being bent reversely, for the main portion of its length, from the prongs 22. That is, the body portion of the fastener is bent to be convexly curved on its upper face from the bases of prongs 22 to its end 26 distal from the prongs. This increases the resilient clamping action of the fastener.

To secure a picture in the frame 10 by means of fastening devices 20, the glass 14 and picture 16 are first placed in the frame, the picture 16 being placed upon the glass. Then a desired number of fastening devices 20 are applied to backing member 18, as shown in Fig. 5, by engaging the hook portion of each fastener 24 over an edge of the backing member, with the body of the fastening device abutting against the outside face of the backing member. Then the backing member with the fasteners attached thereto is pressed into the frame rabbet 12 as far as it will go. The curved prongs 22 of the fasteners engage and slide along the side faces of rabbet 12 as member 18 is pressed into place. Since the prongs curve outwardly, they yield somewhat and do not bite into the frame on this inward movement of the backing member. However, when the backing member is in place, the prongs 22 on the fasteners dig into the wooden frame, and hold the backing member, picture, and glass firmly in place. The curvature of the prongs causes them to bite deeply into the picture frame if any rearward pressure is exerted on glass 14 or backing member 18. The greater the rearward pressure on the backing member, the deeper the prongs 22 are forced into the frame, within their holding capacity. The curvature of the body portion of the fastener causes end 26 of the fastener to exert pressure on the backing member 18 to hold the photograph tightly against the glass, and the glass tightly against its seat.

Fasteners 20 hold a picture just as securely, if not more securely, than brads. They are easy to apply. They do not have to be driven into the frame by a hammer or other tool; and two fasteners 20 will hold a normal size photograph securely in place where a half-dozen or so brads might be required. Any desired number of fasteners 20 may, however, be mounted on a backing member 18, depending on the size of the picture.

There is no danger of breaking or cracking the glass when backing member 18 with the fasteners 20 thereon is pushed into place; and the fasteners 20 will not split or materially mar the frame.

Referring now to Figs. 7–9 inclusive, 30 indicates a fastening device constructed according to another embodiment of the invention. Fastening device 30 is particularly adapted for use in securing in a rabbetted, wooden picture frame a picture such as a painting on a thick piece of material such as masonite. Fastener 30 is also made from a thin, metal stamping. It comprises a rectangular piece of metal which is bent down at one end, as denoted at 31, and which has its downwardly bent portion 31 slit, cut, and bent to form sharp prongs 32 at its sides, and a hook 34 that lies between the prongs. Hook 34 has its free end extending approximately parallel to the body portion of the fastener. The fastener 30 shown has a substantially greater width than fastener 20. However, its body portion is similarly formed with a slight downward curvature from end to end.

To secure a thick, picture 40 in a wooden picture frame 10 having a rabbet 12, a plurality of fasteners 30 are applied to picture 40 at spaced intervals around its periphery. Naturally, the size of picture 40 will determine the number of fasteners to be used. Each fastener 30 is applied to picture 40 by hooking the hook portion 34 of the fastener over the edge of the picture with the body portion of the fastener abutting against the rear face of the picture. The picture is fitted into the rabbet 12 and pressed into place. The curved prong portions 32 slide against the edges of the rabbet, as the picture is pushed forwardly. Once the picture is in position, the prongs 32 on the fastening devices dig into frame 10 and resist any outward movement of the picture.

While the invention has been described in connection with two different embodiments thereof and particular uses therefor, it will be understood that it is capable of further modification; and this application is intended to cover any variations, uses or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A device for securing an element in a rabbeted picture frame, comprising a one-piece, resilient, metal retaining member having a body portion, a hook bent under the front side of said body portion at one end thereof to form with said body portion a groove that opens toward the opposite end of said body portion and that is adapted to receive said element, and a pair of prongs projecting away from said one end of said body portion at opposite sides of said hook and engageable with said frame, said prongs curving rearwardly from their inner to their outer ends.

2. A device for securing a backing element in a rabbeted picture frame, which is adapted to hold a pane of glass, a picture positioned against the glass, and a backing element abutting against the picture, said device comprising a one-piece, resilient, metal retaining member having a body portion, a hook integral with said body portion at one end of said body portion and projecting under the front side of said body portion to form with said body portion a groove opening toward the opposite end of said body portion and adapted to receive an edge of said backing element, and a pair of prongs projecting rearwardly away from said one end of said body portion and engaging the adjacent rabbeted portion of said frame, said body portion being reversely bent to apply spring pressure to the rear side of said element to press said element against said picture.

3. A device for securing an element in a rabbeted, wooden, picture frame comprising a one-piece, resilient, metal retaining member having a body portion which engages the rear side of said element, a hook which is bent under the front side of said body portion at one end thereof across part only of the width of said body portion and which forms with said body portion a groove facing toward the opposite end of said body portion and adapted to receive an edge of said element, and a pair of prongs at opposite sides of said hook which project outwardly and rearwardly relative to said hook and engage said frame, said body portion being reversely bent to cause it to apply spring pressure to the back of said element to press said element into said frame.

4. A device for securing an element in a rabbeted, wooden picture frame wherein said element seats within the rabbet, there being a space between the periphery of said element and the side faces of the frame formed by the rabbet, comprising a one-piece, resilient, metal retaining member having a body portion which is reversely bent to abut at one end against the rear face of said element to cause it to apply spring pressure against said rear face, a hook which is bent under the front face of said body portion at its opposite end and which forms with said body portion a groove opening toward said one end of said body portion and adapted to receive an edge of said element, and a pair of sharp prongs at said opposite end disposed, respectively, at opposite sides of said hook which project outwardly and rearwardly from said hook, said prongs having a length greater than said space and being adapted to bite into said wooden frame.

References Cited in the file of this patent

UNITED STATES PATENTS

| | | |
|---|---|---|
| 589,600 | Hendricks | Sept. 7, 1897 |
| 700,256 | Tapscott | May 20, 1902 |
| 1,071,394 | Clarin | Aug. 26, 1913 |